United States Patent
Uyeki et al.

(10) Patent No.: US 9,731,615 B2
(45) Date of Patent: Aug. 15, 2017

(54) GRID OVERLAY FOR A ZIP CODED MAP SYSTEM AND METHOD THEREFOR

(71) Applicant: Honda Motor Co., Ltd., Minato-ku, Tokyo (JP)

(72) Inventors: Robert Uyeki, Torrance, CA (US); Christine O Nguyen, Rancho Palos Verdes, CA (US)

(73) Assignee: HONDA MOTOR CO., LTD., Tokyo (JP)

( * ) Notice: Subject to any disclaimer, the term of this patent is extended or adjusted under 35 U.S.C. 154(b) by 386 days.

(21) Appl. No.: 14/667,311

(22) Filed: Mar. 24, 2015

(65) Prior Publication Data

US 2016/0280089 A1    Sep. 29, 2016

(51) Int. Cl.
*B60L 11/18*    (2006.01)
*H02J 3/28*    (2006.01)
*H02J 7/00*    (2006.01)

(52) U.S. Cl.
CPC ....... *B60L 11/1842* (2013.01); *B60L 11/1824* (2013.01); *B60L 11/1844* (2013.01); *B60L 11/1861* (2013.01); *H02J 3/28* (2013.01); *H02J 7/0027* (2013.01); *B60L 2230/16* (2013.01); *B60L 2240/70* (2013.01); *Y02E 60/721* (2013.01); *Y02T 10/7005* (2013.01); *Y02T 90/121* (2013.01); *Y02T 90/128* (2013.01); *Y02T 90/14* (2013.01); *Y02T 90/16* (2013.01); *Y02T 90/163* (2013.01); *Y04S 10/126* (2013.01)

(58) Field of Classification Search
CPC .............. B60L 11/1842; B60L 11/1844; B60L 11/1861; Y02T 90/128; Y02E 60/721; Y04S 10/126
See application file for complete search history.

(56) References Cited

U.S. PATENT DOCUMENTS

| | | | |
|---|---|---|---|
| 7,747,739 B2 | 6/2010 | Bridges et al. | |
| 8,019,483 B2 | 9/2011 | Keefe | |
| 8,121,741 B2 | 2/2012 | Taft et al. | |
| 8,314,587 B2 | 11/2012 | White et al. | |
| 8,509,976 B2 | 8/2013 | Kempton | |
| 8,577,528 B2 | 11/2013 | Uyeki | |
| 8,594,859 B2 | 11/2013 | Contreras Delpiano et al. | |
| 8,676,636 B2 | 3/2014 | Genschel et al. | |
| 8,706,650 B2 | 4/2014 | Ozog | |
| 8,796,881 B2 | 8/2014 | Davis | |
| 2007/0282495 A1 | 12/2007 | Kempton et al. | |
| 2008/0281663 A1 | 11/2008 | Hakim et al. | |
| 2009/0030712 A1 | 1/2009 | Bogolea | |
| 2009/0063680 A1 | 3/2009 | Bridges et al. | |
| 2010/0082464 A1 | 4/2010 | Keefe | |

(Continued)

FOREIGN PATENT DOCUMENTS

WO    WO2011043967    4/2011

*Primary Examiner* — Robert Deberadinis
(74) *Attorney, Agent, or Firm* — Arent Fox LLP

(57) ABSTRACT

A system and method for managing a demand response (DR) event requests divides a geographic region into a plurality of units, wherein each unit is associated with a specific utility provider; issues a DR event request from the specific utility provider for at least one particular unit of the plurality of units; determines which of a plurality of vehicles are in the at least one particular unit; determines a subset of the plurality of vehicles that meet qualifying criteria of the DR event request; and sends a vehicle to grid (V2G) request to the subset of the plurality of vehicles to participate in the DR event request.

20 Claims, 4 Drawing Sheets

(56) References Cited

U.S. PATENT DOCUMENTS

| | | |
|---|---|---|
| 2011/0004358 A1 | 1/2011 | Pollack et al. |
| 2011/0025556 A1 | 2/2011 | Bridges et al. |
| 2011/0130885 A1 | 6/2011 | Bowen et al. |
| 2013/0173331 A1 | 7/2013 | Mohagheghi et al. |
| 2013/0179061 A1 | 7/2013 | Gadh et al. |
| 2013/0211988 A1 | 8/2013 | Dorn et al. |
| 2013/0241485 A1 | 9/2013 | Snyder |
| 2013/0289790 A1 | 10/2013 | Park |
| 2014/0005852 A1 | 1/2014 | Asghari et al. |

GRID OVERLAY FOR A ZIP CODED MAP SYSTEM AND METHOD THEREFOR

TECHNICAL FIELD

The present application in general relates to vehicles, and more specifically, to a grid overlay for a zip coded map for managing demand response events for particular utility providers and a method therefor.

BACKGROUND

For proper operation of electrical power grid systems, electricity production and electricity consumption should be fairly balanced. A significant imbalance in electricity production/consumption may lead to grid failure. Demand Response (DR) may refer to the changes in electric usage by end-use customers from their normal consumption patterns in response to changes in the price of electricity over time. DR may typically be aimed at reducing peak demand to reduce the risk of potential disturbances, and to avoid use of more expensive and/or less efficient operating plants. DR programs may offer incentives to electricity users to reduce their power usage in response to a utility provider's need for power due to a high, system-wide demand for electricity or emergencies that may affect the power grid. Alternatively, DR programs may offer incentives to electricity users to provide energy back to the power grid.

Vehicle-to-grid (V2G) is a term which may be used to describe a system and or method in which plug-in electric vehicles, such as battery electric cars (BEVs) and plug-in hybrids (PHEVs) (hereinafter PHEVs), communicate with the power grid in order to sell DR services by providing power back to the power grid or by modifying their charging rate. V2G systems may utilize the excess battery storage capacity in the PHEVs to help stabilize the power grid. For example, V2G systems may communicate with a PHEV so that the PHEV may be recharged during off-peak hours at cheaper rates while helping to absorb excess night time electrical generation when overall demand is lower, where the electric vehicles may serve as a distributed battery storage system to buffer power. V2G systems may communicate with PHEVs to send excess battery storage capacity in the PHEVs back to the power grid. This may help to stabilize the power grid during high-peak times and minimize potential rolling blackouts during high-peak times. Using the electrical storage capabilities of electric vehicles has the potential mitigating the need to build additional generating plants to handle peak loading.

While there are many potential benefits to utilizing electric vehicles in a V2G system for DR, there may be difficulty in determining the available load for a particular utility provider due to the fact that several different utility providers may service the same zip code. For example, even if a PHEV is located within a specific zip code, that PHEV may not be able to provide energy to the particular utility provider in need (e.g. Pacific Gas and Electric Company) because the PHEV may be located in a different utility provider's area (e.g. Southern California Edison) within that zip code. Even if a PHEV is located within the specific zip code and is a customer of the particular utility provider issuing the DR, the PHEV may be located too far from the area where power may be needed to be to provide back to the electrical grid.

It would thus be desirable to provide a system and method that enables a more accurate calculation of available V2G load for a specific utility provider that may be provided by PHEVs located within a specific area of a zip code designated to that utility provider.

SUMMARY

In accordance with one embodiment, a method for managing a demand response (DR) event request is disclosed. The method includes: dividing a geographic region into a plurality of units, wherein each unit is associated with a specific utility provider; issuing a DR event request from the specific utility provider for at least one particular unit of the plurality of units; determining which of a plurality of vehicles are in the at least one particular unit; determining a subset of the plurality of vehicles that meet qualifying criteria of the DR event request; and sending a vehicle to grid (V2G) request to the subset of the plurality of vehicles to participate in the DR event request.

In accordance with one embodiment, a system for managing demand response (DR) event requests is disclosed. The system for managing demand response (DR) event requests has a network configured for communication between one or more utility providers, a vehicle company, and a plurality of vehicles manufactured by the vehicle company. The system has at least one server with a database containing information for the plurality of vehicles. The at least one server has a processor configured to access the database and to execute a set of program instructions causing the processor to: divide a geographic region into a plurality of units, wherein each unit is associated with a specific utility provider; issue a DR event request from the specific utility provider for a region defined by at least one particular unit of the plurality of units; determine which of the plurality of vehicles are in the at least one particular unit; determine a subset of the plurality of vehicles that meet qualifying criteria of the DR event request; and send a vehicle to grid (V2G) request to the subset of the plurality of vehicles to participate in the DR event request.

In accordance with one embodiment, a method for managing demand response (DR) event requests is disclosed. The method includes: dividing a geographic region having a plurality of utility providers into a plurality of units, each unit associated with a specific utility provider, the plurality of units arrange in a grid, wherein each unit of the plurality of units share at least one common border with an adjacent unit; issuing a DR event request by a first of the plurality of utility providers, the DR event request designated for at least one particular unit of the plurality of units associated with the first of the plurality of utility providers; determining which of a plurality of vehicles are in the at least one particular unit; determining a subset of the plurality of vehicles that meet qualifying criteria of the DR event request, the qualifying criteria established to reduce battery degradation of the plurality of vehicles; sending a vehicle to grid (V2G) request to the subset of the plurality of vehicles to participate in the DR event request; and recording each vehicle of the subset of the plurality of vehicles that participates in the V2G request.

BRIEF DESCRIPTION OF THE DRAWINGS

The present application is further detailed with respect to the following drawings. These figures are not intended to limit the scope of the present application but rather illustrate certain attributes thereof.

DESCRIPTION OF THE APPLICATION

The description set forth below in connection with the appended drawings is intended as a description of presently preferred embodiments of the disclosure and is not intended to represent the only forms in which the present disclosure may be constructed and/or utilized. The description sets forth the functions and the sequence of steps for constructing and operating the disclosure in connection with the illustrated embodiments. It is to be understood, however, that the same or equivalent functions and sequences may be accomplished by different embodiments that are also intended to be encompassed within the spirit and scope of this disclosure.

Embodiments of the exemplary method and system allow for a calculation of available V2G load for a specific utility provider that may be provided by PHEVs located within specific areas of a zip code that are designated to that utility provider. The method and system allows vehicle manufacturers to predict the amount and volume of V2G electrical loads that may be contributed to the power grid at any given time, which may be beneficial since the amount and volume of V2G electrical loads may fluctuate due to the fact that electric vehicles may be traveling in and out of the specific zip code areas designated to the particular utility providers.

Figure 1:
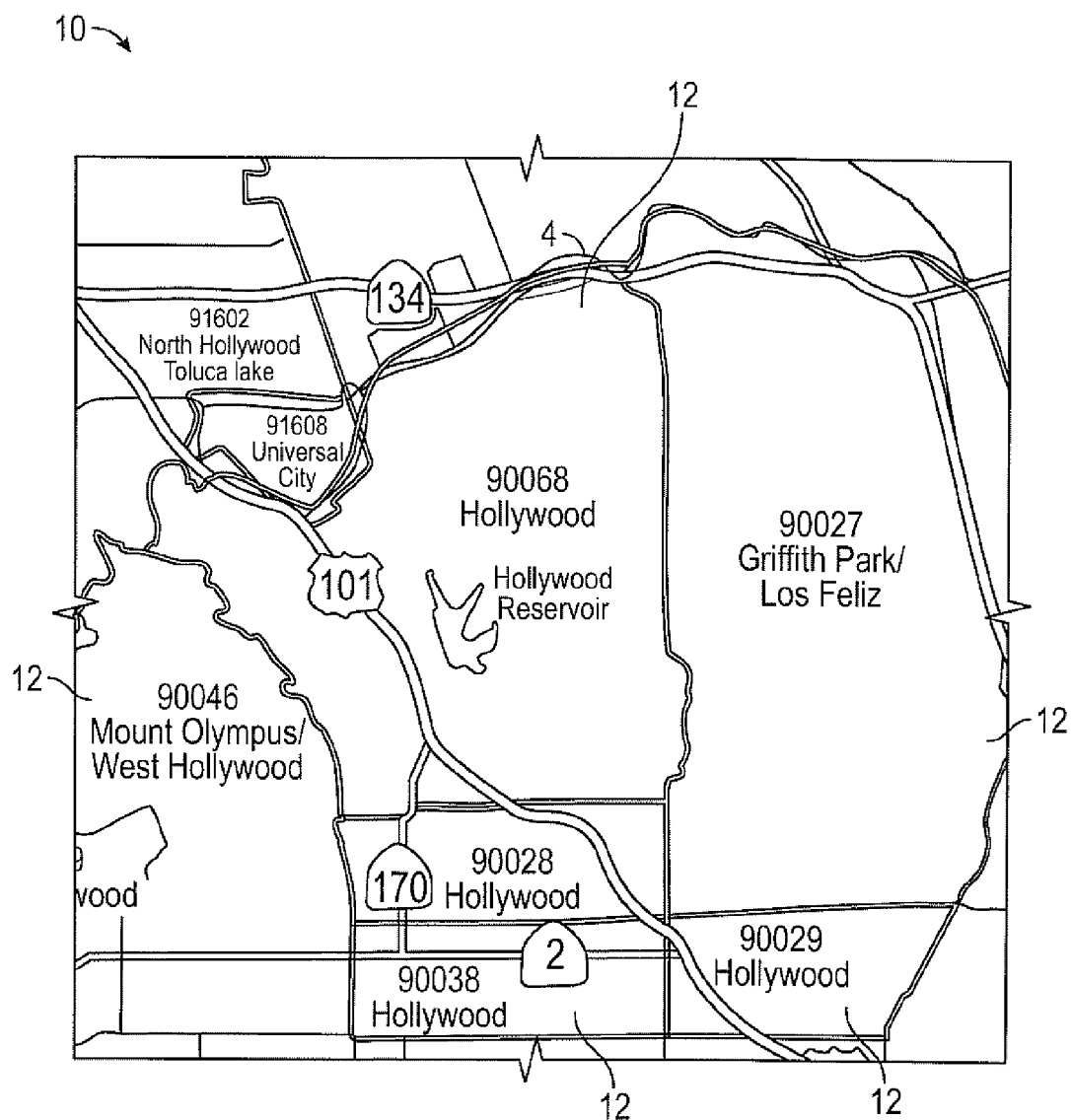
FIG. 1 is an exemplary zip coded map showing the geographical boundaries of several zip codes.

Referring to FIG. 1, an example of a map 10 showing the geographical boundaries of several zip code areas 12 within an area, such as Los Angeles County may be seen. One or more utility providers may provide service to each zip code area 12. For example, consumers in the zip code area 12 designed by 90029 may be provided with electrical service by one electrical utility provider. Customers in the zip code area 90027 and 90068 may be provided with electrical service by multiple electrical utility providers. For customer in zip code areas 12 being serviced by multiple electrical utility providers, the particular electrical utility provider may be based on the location of the resident and/or business within the particular zip code area 12.

Figure 2:
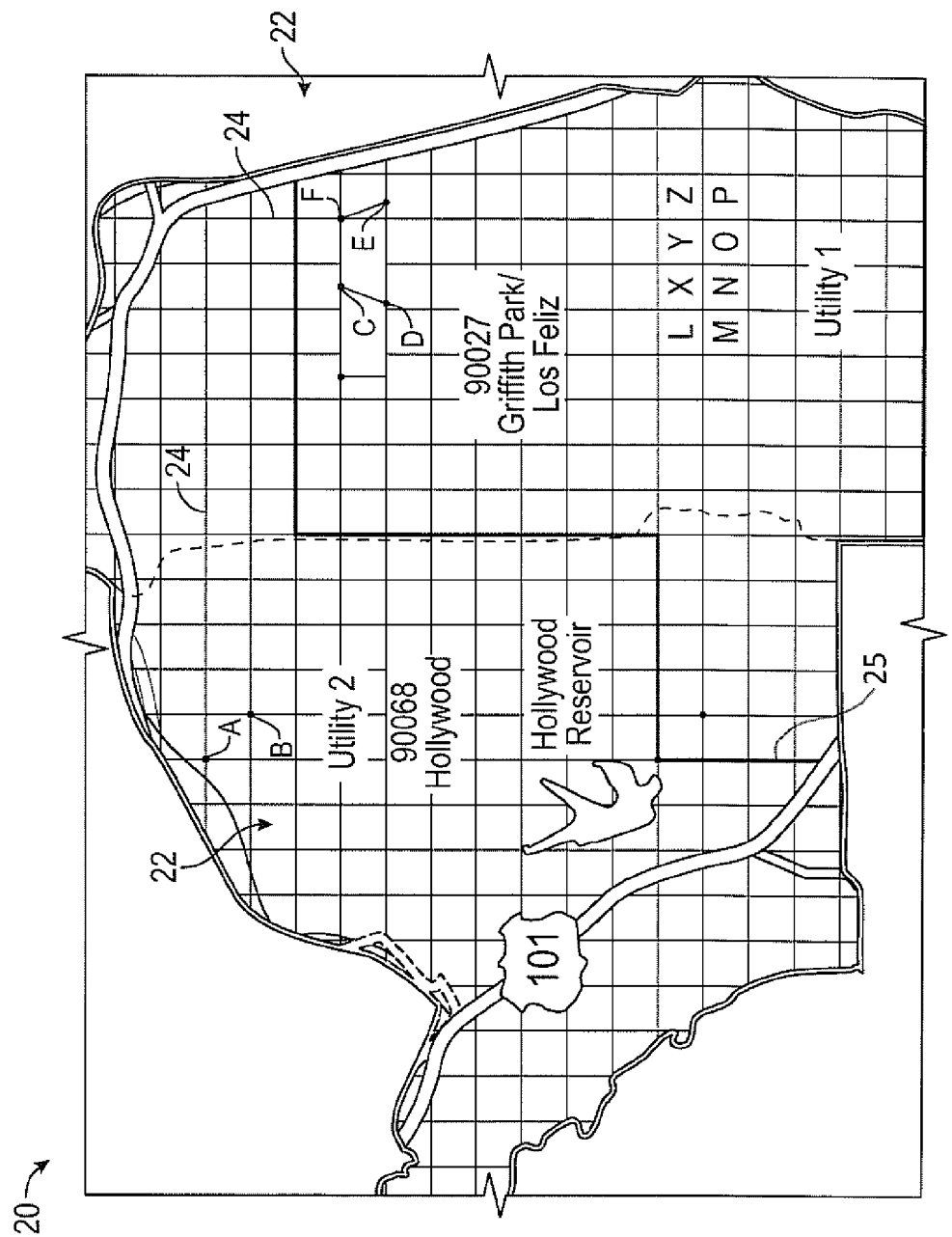
FIG. 2 is an exemplary grid overlay zip coded map showing certain areas within each zip code that are assigned to and serviced by particular utility providers according to one aspect of the present application.

Referring to FIG. 2, one exemplary embodiment of a grid overlay zip coded map 20 may be seen. The grid layover zip coded map 20 may show geographical boundaries of several zip code areas 22 within a particular area such as Los Angeles County. The zip code areas 22 may be serviced by multiple electrical utility providers. For example, Utility Company 1 may serve customers in an area below and/or to the right of line 25, while Utility Company 2 may serve customers above and/or to the left of line 25. Thus, consumers in the 90027 zip code area 22 may primarily be served by Utility Company 1, except for certain areas, such as a northern region of the 90027 zip code area 22 above line 25, which may be serviced by Utility Company 2. Similarly, consumers in the 90068 zip code area 22 may primarily be served by Utility Company 2, except for certain areas, such as a southern region of the 90027 zip code area 22 below and/or to the right of line 25, which may be serviced by Utility Company 1.

Each zip code area 22 may be divided into one or more units 24. The units 24 may be defined by boxes, wherein one corner A (e.g. an upper left hand point) of the box is a specific latitude/longitude point and wherein the opposing corner B (e.g. the lower right hand point) of the box is another specific latitude/longitude point. Alternatively, the units 24 may be formed of configurations defined by multiple pairs C-F of latitude/longitude points. While the embodiment shown in FIG. 2, show the units 24 as box like in shape, the units 24 may take on other geometric forms. Each unit 24 may be of different sizes and/or shapes. A unit 24 may be contained entirely within a given zip code area 22 or the unit 24 may overlap two or more zip codes.

The units 24 may be arrange in a grid like manners wherein each unit 24 may share one or more common borders with an adjacent unit 24. The units 24 may be formed over all or a majority of the zip code area 22. Units 24 may not be formed in certain regions of the zip code area 22 where power demand may be limited. For example, units 24 may not be formed in areas having bodies of water or mountainous regions having minimal population. In the zip code area 24 labeled as 90068, units 24 may not be formed in the area labeled as Hollywood Reservoir as this is a body of water.

Each unit 24 may be designated for a particular utility provider, such as Pacific Gas and Electric Company (PG&E), Southern California Edison, or other utility providers in the area. A given utility provider may have more than one unit 24 within a single zip code and may have one or more units 24 in several zip codes. For a utility provider to calculate the load for any given area, the zip code areas 22 are still provided, but each zip code area 22 may now be divided into a plurality of units 24. These units 24 now may be more easily distinguished using a granularity within the zip code area 22. By breaking the zip code areas 22 into a plurality of smaller units 24, the utility provider may more accurately determine the potential power usage as well as the available load that may be sent back to the grid for a particular area.

Figure 3:
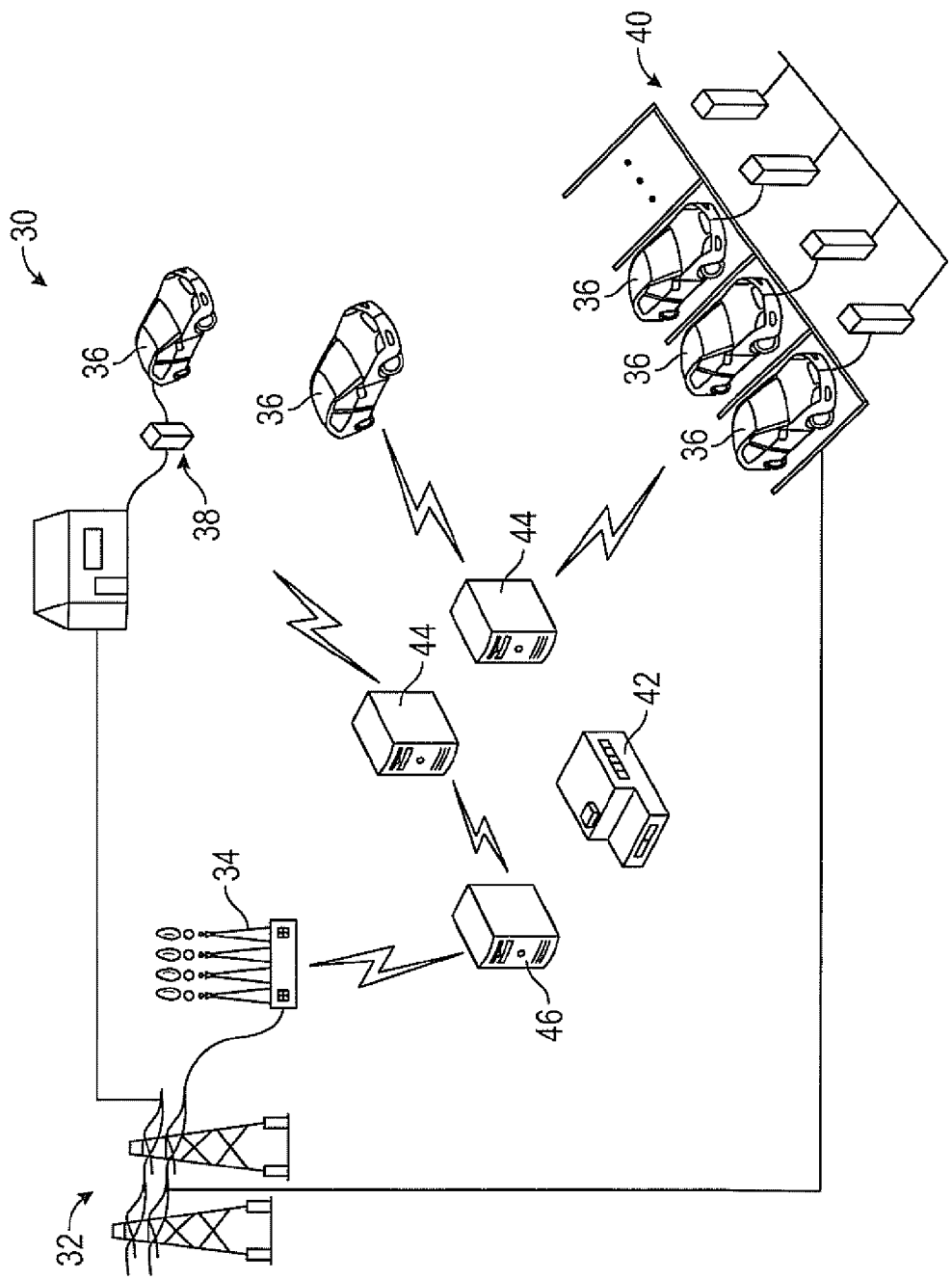
FIG. 3 is an exemplary system for managing DR event requests for particular utility providers through V2G requests for vehicles according to one aspect of the present application.
Figure 4:
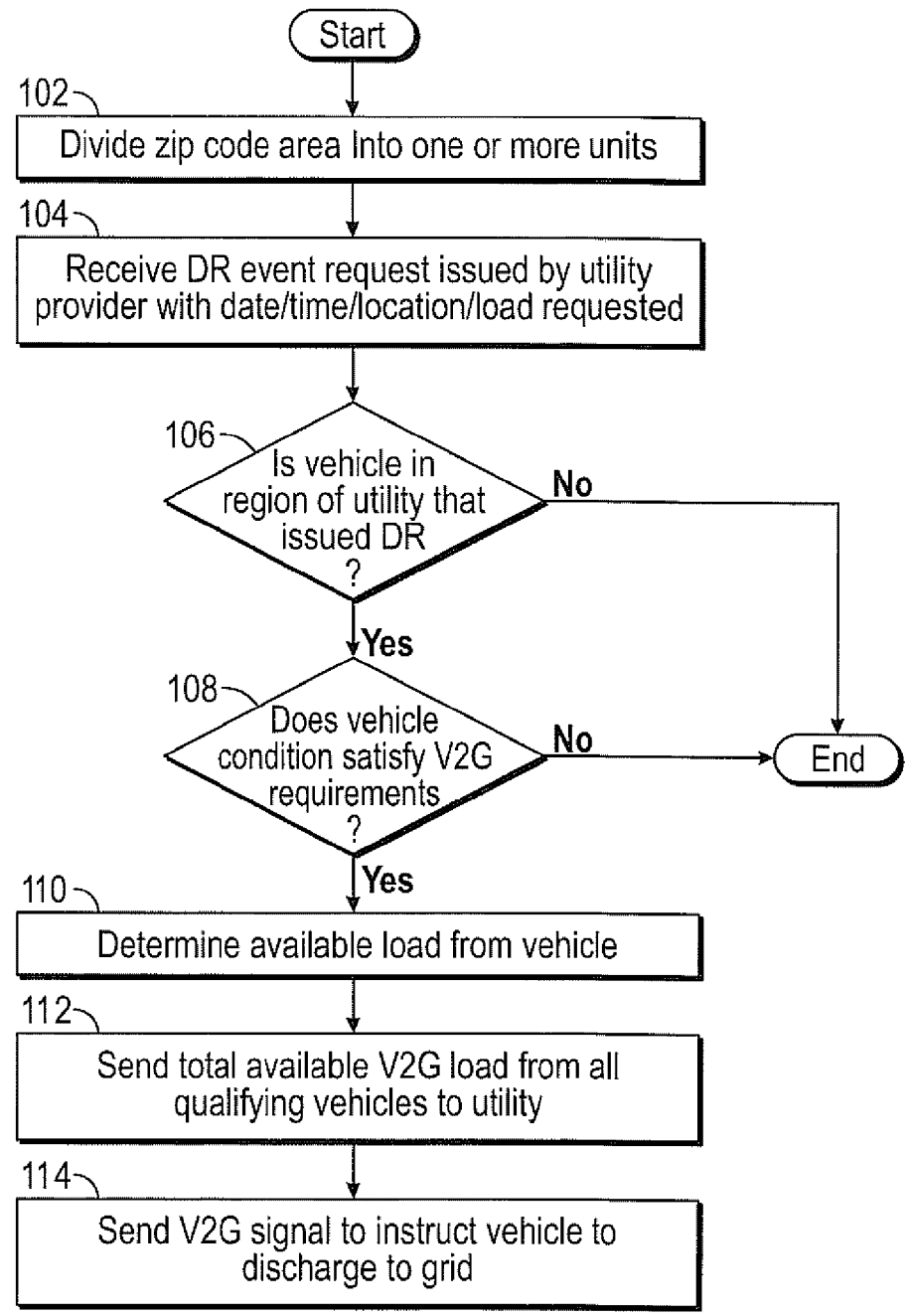
FIG. 4 is an exemplary flowchart depicting a method for managing DR services for particular utility providers through V2G requests for vehicles according to one aspect of the present application.

Referring to FIG. 3, an exemplary system 30 for managing DR event requests for particular utility providers 34 is shown. The system 30 may provide a strategy to receive a DR event request issued by a specific utility provider 34, identify possible electric vehicles 36 located in and/or serviced by the specific utility provider 34 to potentially discharge power to the power grid 32, and provide the specific utility provider 34 with a total calculated event load that indicates the amount of energy that may be delivered to the portion of the power grid 32 that is serviced by the specific utility provider 34 via V2G transfer from qualifying electric vehicles 36. The system 30 may use information regarding the state of charge of the vehicles 36 to predict a future amount of energy that may be needed in a particular area to recharge the vehicles 36. Thus, the system 30 may provide the specific utility provider 34 with a total calculated event load that indicates the amount of power that may be reduced on the power grid 32 for a specific geographical region of the zip code area assigned to and serviced by the utility provider 34.

Interconnected utility providers 34 within each power grid 32 may buy and sell power among them. In the system 30, vehicles 36 that may be participating in the V2G request may provide energy stored in battery packs of the vehicles 36 back to the power grid 32. Vehicles 36 may provide the stored energy back to the power grid 32 through a charging station 40 which may be publically operated, privately operated or operated by any other 3$^{rd}$ party. The vehicles 36 may also provide the stored energy back to the power grid 32 through a home charging station 38.

The vehicle 36 may transmit data related to the operation of the vehicle 36. For example, the vehicle 36 may transmit data related to the current location of the vehicle 36, the charging data of the vehicle 36 (e.g. state of charge, availability, accessibility, any data related to the charging of the vehicle 36, battery condition, any data related to a charging station 40 or home charging station 38 coupled to the vehicle 36, etc.), or other operating conditions of the vehicle 36. The data may be transmitted in real time or at predetermined times such as when the vehicle 36 is turned off or when the vehicle 36 is charging at a charging station 40 or home charging station 38. The data related to the operation of the vehicle 36 may be transmitted to a vehicle company; i.e. an original equipment manufacturer (OEM) 42 or other third party monitoring facility. The OEM 42 or other party may also transmit data to the vehicle 36 such as V2G requests as will be discussed below.

In accordance with one exemplary embodiment, when the vehicle 36 is connected to the home charging station 38, the data may be downloaded to the home charging station 38. The home charging station 38 may transmit the downloaded data to the OEM 42. Alternatively, when the vehicle 36 is connected to the home charging station 38, the vehicle 36 may transmit the data through a telematics system of the vehicle 36 to the OEM 42. Similarly, when the vehicle 36 is connected to the charging station 40, the data may be downloaded to the charging station 40 which may transmit the downloaded data to the OEM 42. Alternatively, when the vehicle 36 is connected to the charging station 40, the vehicle 36 may transmit the data through a telematics system of the vehicle 36 to the OEM 42. The home charging station 38 or the charging station 40 may transmit the data to a third party charging station network, which would then transmit the data to the OEM 42. Alternatively, the home charging station 38 or the charging station 40 may transmit the data directly to the OEM 42.

The data may be transmitted via a network. The network may include a fixed wire line network, cable and fiber optics, over the air broadcasts, cellular, satellite, local area network (LAN), wide area network (WAN), or global network (e.g., Internet). For example, if the data is downloaded to the home charging station 38, the data may be transmitted to the OEM 42 via a fixed wired telephone network. Alternatively, the data may be transmitted wirelessly to the OEM 42 from the electric vehicle 36 (e.g. via a telematics control unit of the electric vehicle 36) or from a portable device associated with the electric vehicle 36 (e.g. a cellular phone in the possession of an owner of the vehicle 36). If the data is being transmitted through the telematics system in the vehicle 36 to the OEM 42, the system 30 may use a GPS unit of the vehicle 36 to determine its location and use an embedded transmission control unit (TCU) to communicate with the OEM 42. Alternatively, the system 30 may use the GPS unit of the vehicle owner's cellular phone to determine the location of the vehicle 36 and use a cellular network to communicate with the OEM 42.

The OEM 42 may store, aggregate, and or analyze the data that it has received from the vehicles 36 via wired or wireless communication networks. The data may be stored and/or analyzed on one or more OEM servers 44 and/or an OEM central server 46. While FIG. 3 shows one OEM 42, any number of OEMs 42 may be used and the OEMs 42 may be in communication with each other. In accordance with one embodiment, the OEM servers 44 and the utility providers 34 may be networked to an OEM central server 46 so that data may be shared among the OEM 42, the utility providers 34, and the vehicles 36. The OEM 42 may have multiple OEM servers 44 connected to the OEM central server 46, wherein each participating vehicle 36 may be associated with a particular OEM server 44.

Each OEM server 44 and/or the central server 46 may have a processor. The processor may be implemented in hardware, software or a combination thereof. The processor may store a computer program or other programming instructions associated with a memory to control the operation of the OEM server 44 and the central server 46 and to analyze the data received. The data structures and code within the software in which the present application may be implemented, may typically be stored on a non-transitory computer-readable storage. The storage may be any device or medium that may store code and/or data for use by a computer system. The non-transitory computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed. The processor may comprise various computing elements, such as integrated circuits, microcontrollers, microprocessors, programmable logic devices, etc., alone or in combination to perfonn the operations described herein.

Referring to FIGS. 1-4, a method 100 of operation for the system 30 may be disclosed. Each zip code area 22 may be divided into one or more units 24 as shown in block 102. The units 24 may be defined by boxes, wherein one corner (e.g. an upper left hand point) of the box is a specific latitude/longitude point and wherein the opposing corner (e.g. the lower right hand point) of the box is another specific latitude/longitude point. Alternatively, the units 24 may be formed of configurations defined by a plurality of latitude/longitude points. The units 24 may be arrange in a grid like manners wherein each unit 24 may share one or more common borders with an adjacent unit 24. The units 24 may be formed over all or a majority of the zip code area 22. Each unit 24 may be designated for particular utility provider 34 that may service the zip code area 22.

The processor of the OEM central server 46 may receive a DR event request from a particular utility provider 34 as shown in block 104. The DR event request may be indicative of a DR event for a specific unit 24 and/or an geographic area defined by a plurality of neighboring units 24 that is assigned to and serviced by the particular utility provider 34. The DR event request may include a set of rules and requirements (e.g. event parameters) for participation in the DR event. The DR event request may include rate information and incentives for participating in the DR event. For example, a DR event request may include, but is not limited to, the following parameters: event type, an area (e.g. service territory), temporal information (e.g. date, time for participation), rate information, minimum reduction load, and maximum reduction load, and duration of the event.

The DR event request may be generated in real-time or one or more days ahead. For example, the temperature in a particular area may be forecasted to be unseasonably high for the next 2-3 days. In this case, the utility provider 34 may send the DR event request one or more days in advance to prepare for the higher energy demands that may come with hotter than normal temperatures.

The processor of the OEM central server 46 may generate a query on the OEM servers 44. The OEM servers 44 may process location data received from the vehicles 36 as well as their charging data. A determination as shown in block 106 may be made if each of the vehicles 36 is located within a geographical area defined by the DR event request and assigned to the specific utility provider 34 that issued the DR event request. Thus, if the DR event request is for a specific unit 24, a determination may be made if each of the vehicles 36 is located in the specific unit 24 of the zip code area 22 assigned to the utility provider 34 that issued the DR event request. If the DR event request is for a geographic area defined by a plurality of neighboring units 24, a determination may be made if each of the vehicles 36 is located in the geographic area defined by the plurality of neighboring units 24 of the zip code area 22 assigned to the utility provider 34 that issued the DR event request. The determination may be made in different manners. For example, the current location of the vehicle 36 may be determined through: 1) the GPS unit of the vehicle 36; 2) the GPS unit in a cellular phone of the user of the vehicle 36 that is connected to the telematics system of the vehicle 36; or 3) through a charging station 40 or home charging station 38 when the vehicle 36 is connected thereto. In another embodiment, the OEM servers 44 may receive charging data and/or location data from the vehicles 36 upon completion of an ignition cycle. If the vehicle 36 is not in the geographical region or unit 24 (block 106 is No), then the vehicle 36 does not qualify to participate in the DR event request.

If the vehicle 36 is determined to be within the geographical area (single and/or plurality of units 24) defined by the DR event request and assigned to the utility provider 34 (block 106 is Yes), a determination as shown in block 108 is made as to whether the vehicle 36 meets certain criteria to be permitted to participate in the DR event request. In general, just being in the defined geographic area defined in the DR event request and assigned to the utility provider 34 may not warrant participation by the vehicle 36 in the DR event request since information related to the condition of the vehicle 36 itself or its battery condition may need to be considered.

The OEM servers 44 and/or central server 46 may analyze the data in order to determine which vehicles 36 may receive the V2G request to upload power back to the power grid 32. This determination may be made in such a way as to help prevent battery degradation of participating vehicles. For example, in order to participate in the V2G transfer, certain criteria may need to be satisfied by the vehicle 36. These criteria may consider vehicle-specific conditions, such as location, state of charge, V2G history, distance from a charging station, number of discharge cycles, vehicle range based on a fully charged battery pack, or condition and degree of degradation of the battery pack. The criteria may also consider operating temperature, frequency of usage, a number of trips below a predefined mileage, a number of quick charges or other criteria that accelerates battery degradation. If the vehicle 36 does not meet the criteria to be permitted to participate in the DR event request (block 108 is No), then the vehicle 36 does not qualify to participate in the DR event request. If the vehicle 36 is determined to be located within a unit 24 of the zip code area 22 assigned to the utility provider 34, and meets the criteria to be permitted to participate in the DR event request (block 108 is Yes), the OEM servers 44 may then return charging data from electric vehicles 36 that are located within that unit 24 that meet the query as shown in block 110. Based on the charging data returned from the query, the processor of the OEM servers 44 and/or the central server 46 may determine a total DR event load; i.e. the amount of available energy that may be transferred back to the power grid 32 from the qualifying vehicles 12 via V2G for a particular unit 24 as shown in block 112.

If qualifying vehicles 36 are determined to be located within a unit 24 of the zip code area 22 assigned to the utility provider 34 and meet the criteria to be permitted to participate in the DR event request, the OEM servers 44 and/or the OEM central server 46 may send the DR event request to the qualifying vehicles 36 as shown in block 114. If a vehicle 36 does participate in V2G transfer, then the vehicles 36 participation may be recorded in a database managed by the OEM 20.

An example of the operation of the system 30 may be as follows. The zip code area 22 labeled 90027 may be served by multiple utility providers 34. For example, Utility Provider 1 may serve a majority of 90027 zip code area 22, while Utility Provider 2 may serve a northern section of the 90027 zip code area 22. Utility Provider 1 may issue a DR request event. The DR event request may be associated with a particular unit 24 of the 90027 zip code area 22. For example, the DR event request may be associated with the geographic area defined by the units 24 labeled "X", "Y" and "Z" in the 90027 zip code area 22. Since Utility Provider 1 issued the DR event request, consumers associated with Utility Provider 2 but in the 90027 zip code area 22 may not be eligible to participate. However, there may be situations where consumers associated with Utility Provider 2 and in the 90027 zip code area 22 may be considered. For example, if the total available load from vehicles 36 associated with Utility Provider 1 is insufficient to cover the DR event request, consumers associated with Utility Provider 2 and in the 90027 zip code area 22 may be eligible to participate.

A determination may be made as to the location of vehicles 36 eligible to participate (i.e., vehicles 36 associated with Utility Provider 1) in the DR event request. In the present embodiment, a determination may be made as to whether eligible vehicles 36 are located in the geographic area defined by the units 24 labeled "X", "Y" and "Z". If a vehicle 36 is not located in one of the units 24 labeled "X", "Y" or "Z", that vehicle 36 may no longer be considered eligible for the DR event request. Thus, vehicles located in units 24 labeled "L", "M", "N" or "P" may no longer be considered. If the vehicle 36 is located in one of the units 24 labeled "X", "Y" or "Z", a determination may be made as to whether the qualifying vehicle 36 meets certain criteria to be permitted to participate in the DR event request. For example, criteria related to the condition of the vehicle 36 or its battery condition may need to be considered.

If qualifying vehicles 36 are determined to be located within one of the units 24 labeled "X", "Y" or "Z" of the zip code area 22 assigned to the utility provider 1 and meet the criteria to be permitted to participate in the DR event request, the OEM servers 44 and/or the OEM central server 46 may send the DR event request to the qualifying vehicles 36. If the qualifying vehicle 36 does participate in V2G transfer, then the vehicles 36 participation may be recorded in a database managed by the OEM 20.

By breaking the 90027 zip code areas 22 into a plurality of smaller units 24, utility provider 1 may more accurately determine the potential power usage as well as the available load that may be sent back to the grid since the data may all be associated for a specific unit 24. The utility provider 1 may more accurately determine the potential power usage as well as the available load that may be sent back to the grid for larger areas in a zip code areas 22 where utility provider

What is claimed is:

1. A method for managing a demand response (DR) event request comprising:
   dividing a geographic region into a plurality of units, wherein each unit is associated with a specific utility provider;
   issuing a DR event request from the specific utility provider for at least one particular unit of the plurality of units;
   determining which of a plurality of vehicles are in the at least one particular unit;
   determining a subset of the plurality of vehicles that meet qualifying criteria of the DR event request; and
   sending a vehicle to grid (V2G) request to the subset of the plurality of vehicles to participate in the DR event request.

2. The method of claim 1, comprising recording each vehicle of the subset of the plurality of vehicles that participates in the V2G request.

3. The method of claim 1, comprising establishing the qualifying criteria for the DR event request, the qualifying criteria is established to reduce battery degradation of the plurality of vehicles.

4. The method of claim 1, wherein the plurality of units are arrange in a grid, each unit of the plurality of units sharing at least one common border with an adjacent unit.

5. The method of claim 1, wherein the geographical area is associated with a specific zip code boundary.

6. The method of claim 1, wherein each unit is a rectangular boundary indentified by a two sets of latitude and longitude points.

7. The method of claim 1, wherein each unit is a geometric shape boundary indentified by multiple sets of latitude and longitude points.

8. The method of claim 3, wherein the qualifying criteria comprises State of Charge (SOC) and at least one of: number of discharge cycles, vehicle range based on a fully charged battery pack, or condition and degree of degradation of the battery pack.

9. A system for managing demand response (DR) event requests comprising:
   a network configured for communication between one or more utility providers, a vehicle company, and a plurality of vehicles manufactured by the vehicle company;
   at least one server with a database containing information for the plurality of vehicles, wherein the at least one server has a processor configured to access the database and to execute a set of program instructions causing the processor to:
   divide a geographic region into a plurality of units, wherein each unit is associated with a specific utility provider;
   issue a DR event request from the specific utility provider for a region defined by at least one particular unit of the plurality of units;
   determine which of the plurality of vehicles are in the at least one particular unit;
   determine a subset of the plurality of vehicles that meet qualifying criteria of the DR event request; and
   send a vehicle to grid (V2G) request to the subset of the plurality of vehicles to participate in the DR event request.

10. The system of claim 9, wherein the program instructions executed by the processor, causes the processor to record each vehicle of the subset of the plurality of vehicles that participates in the V2G request.

11. The system of claim 9, wherein the program instructions executed by the processor, causes the processor to establish the qualifying criteria for the DR event request, the qualifying criteria is established to reduce battery degradation of the plurality of vehicles.

12. The system of claim 9, wherein the geographical area is associated with a specific zip code boundary.

13. The system of claim 9, wherein the plurality of units are arrange in a grid, each unit of the plurality of units sharing at least one common border with an adjacent unit.

14. The system of claim 9, wherein each unit is a geometric shape boundary indentified by at least two sets of latitude and longitude points.

15. The system of claim 11, wherein the qualifying criteria comprises State of Charge (SOC) and at least one of: number of discharge cycles, vehicle range based on a fully charged battery pack, or condition and degree of degradation of the battery pack.

16. A method for managing a demand response (DR) event request comprising:
   dividing a geographic region having a plurality of utility providers into a plurality of units, each unit associated with a specific utility provider, the plurality of units arrange in a grid, wherein each unit of the plurality of units share at least one common border with an adjacent unit;
   issuing a DR event request by a first of the plurality of utility providers, the DR event request designated for at least one particular unit of the plurality of units associated with the first of the plurality of utility providers;
   determining which of a plurality of vehicles are in the at least one particular unit;
   determining a subset of the plurality of vehicles that meet qualifying criteria of the DR event request, the qualifying criteria established to reduce battery degradation of the plurality of vehicles;
   sending a vehicle to grid (V2G) request to the subset of the plurality of vehicles to participate in the DR event request; and
   recording each vehicle of the subset of the plurality of vehicles that participates in the V2G request.

17. The method of claim 16, comprising calculating a total event load based on a battery state of charge (SOC) of each vehicle of the subset of the plurality of vehicles, the total event load indicating an amount of energy that may be delivered to the particular unit by the subset of the plurality of vehicles.

18. The method of claim 16, wherein the geographical area is associated with a specific zip code boundary.

19. The method of claim 16, wherein each unit is a geometric shape boundary indentified by at least two sets of latitude and longitude points.

20. The method of claim 16, wherein the qualifying criterion comprises state of charge (SOC) and at least one of: number of discharge cycles, vehicle range based on a fully charged battery pack, or condition and degree of degradation of the battery pack.

* * * * *